(12) United States Patent
Hitchcock et al.

(10) Patent No.: US 11,258,216 B2
(45) Date of Patent: Feb. 22, 2022

(54) FLOATABLE CONNECTOR AND WIRE HARNESS TRAY

(71) Applicant: TE Connectivity Services GmbH, Schaffhausen (CH)

(72) Inventors: Matthew Bryan Hitchcock, Hershey, PA (US); Sameh Mankaryos, Cornelius, NC (US); Kevin John Peterson, Kernersville, NC (US); Paul David Roman, Jr., Harrisburg, PA (US); Andrew Jacob Vasbinder, Boiling Springs, PA (US); Tracy Everette Wilson, Summerfield, NC (US)

(73) Assignee: TE Connectivity Services GmbH

( * ) Notice: Subject to any disclaimer, the term of this patent is extended or adjusted under 35 U.S.C. 154(b) by 0 days.

(21) Appl. No.: 17/106,705

(22) Filed: Nov. 30, 2020

(65) Prior Publication Data
US 2021/0175672 A1    Jun. 10, 2021

Related U.S. Application Data (60) Provisional application No. 62/944,659, filed on Dec. 6, 2019.

(51) Int. Cl.
| | |
|---|---|
| *H01R 24/76* | (2011.01) |
| *H01R 13/52* | (2006.01) |
| *H01R 13/74* | (2006.01) |
| *B60R 16/02* | (2006.01) |
| *H01R 13/631* | (2006.01) |

(52) U.S. Cl.
CPC .......... *H01R 24/76* (2013.01); *H01R 13/52* (2013.01); *B60R 16/02* (2013.01); *H01R 13/5202* (2013.01); *H01R 13/6315* (2013.01); *H01R 13/748* (2013.01)

(58) Field of Classification Search
CPC ...... H01R 24/76; H01R 13/52; H01R 13/748; H01R 13/6315; H01R 13/5202; B60R 16/02
See application file for complete search history.

(56) References Cited

U.S. PATENT DOCUMENTS

| | | | |
|---|---|---|---|
| 6,234,817 B1 * | 5/2001 | Hwang ............... | H01R 13/6315 439/247 |
| 9,270,052 B1 * | 2/2016 | Martin ............... | H01R 13/6315 |
| 9,337,577 B1 * | 5/2016 | Hitchcock .......... | H01R 13/6315 |

* cited by examiner

*Primary Examiner* — Tho D Ta (57) ABSTRACT

An electrical connector with a housing having a mounting opening with a mounting projection. An outwardly facing wall of the mounting projection has at least one detent. A fixed member has a fixed member opening. The fixed member opening has an inner surface with at least one deflectable member which extends from the inner surface into the fixed member opening. A gap is provided between the inner surface of the fixed member opening and the outwardly facing wall of the mounting projection. The mounting projections are able to float radially with the gap. The at least one deflectable member cooperates with the first detent to retain the electrical connector assembly in a pre-staged position.

20 Claims, 9 Drawing Sheets

FLOATABLE CONNECTOR AND WIRE HARNESS TRAY

FIELD OF THE INVENTION

The present invention is directed to a floatable electrical connector and a wire harness tray. In particular, the invention is directed to a header assembly which is located and retained in a wire harness tray.

BACKGROUND OF THE INVENTION

Some known electrical connectors are pass-through connectors that may be used to provide an electrical conductive path through a panel. For example, the panel may be a cover for an electrical device, and the connector extends through a defined opening in the panel to electrically connect electrical components of the device internal to the cover to an external mating connector. The pass-through connector passes through the opening in the panel such that a first portion of the connector is on a first side of the panel and a second portion of the connector is on an opposite second side of the panel. The first portion of the connector may be configured to interface with the mating connector. The second portion of the connector on the other side of the panel may be electrically connected to electrical components of the electrical device. A peripheral seal may be located at the interface between the panel and the connector in order to seal the connector to the panel at the opening. The seal may prevent air, liquid, and/or debris from leaking through the opening of the panel around the connector. In an example application in the automotive industry, the pass-through connector may be installed through a transmission cover to provide electrical power, control, and/or data signals to and/or from the transmission.

Some known electrical connectors are header connectors that are configured to be mounted to a case or housing, such as a housing of an electrical and/or mechanical device. Some known header connectors are pass-through connectors that are mounted to a housing of an electrical device and also extend at least partially through a panel that is placed over the connector. Optionally, the panel may be mounted to the housing of the electrical device separately from the connector, and the connector may not be directly coupled to the panel.

As a result, the opening of the panel may not align correctly with the portion of the connector configured to extend through the panel. For example, the gap between the panel and the connector may be non-uniform, having a larger gap on one side than another. Although a compression seal may be installed at the interface of the connector and the panel, the seal would be compressed more at the side with the smaller gap than at the side with the larger gap. Due to the different gap sizes and resulting different compressive forces on the seal, the seal may fail, allowing a leak at either of the sides having non-uniform gaps. Referring back to the example application of the connector installed on a transmission housing, if the transmission cover is not properly aligned with the connector, a leak path may form that allows the unintentional transfer of pressure, gases, liquids, and contaminants into and out of the transmission cover, which could harm the performance of the transmission.

It would be beneficial to provide an electrical connector that is capable of floating within a predefined area to properly align with a mating connector, an opening in a cover or panel, and/or the like. It would also be beneficial to provide a floatable electrical connector and a wire harness tray which allows the electrical connector to be easily inserted through an opening in the cover or panel.

SUMMARY OF THE INVENTION

An embodiment is directed to an assembly having an electrical connector with a housing having a mounting opening with a mounting projection. An outwardly facing wall of the mounting projection has at least one detent. A fixed member has a fixed member opening. The fixed member opening has an inner surface with at least one deflectable member which extends from the inner surface into the fixed member opening. A gap is provided between the inner surface of the fixed member opening and the outwardly facing wall of the mounting projection. The mounting projections are able to float radially within the gap. The at least one deflectable member cooperates with the first detent to retain the electrical connector assembly in a pre-staged position.

An embodiment is directed to an assembly having an electrical connector and a fixed member. The electrical connector has a housing with a mating end and an oppositely facing mounting end. The mounting end has an electrical connector flange extending therefrom, the electrical connector flange has a mounting opening with a mounting projection extending from the electrical connector flange in a direction away from the mating end. An outwardly facing wall of the mounting projection has a first detent and a second detent. The fixed member has a fixed member flange. The fixed member flange has a fixed member opening having an inner surface with at least one deflectable member which extends from the inner surface into the fixed member opening. A gap is provided between inner surface of the fixed member opening and the outwardly facing wall of the mounting projection, wherein the mounting projections are able to float radially within the gap. The mounting projection is movable relative to the at least one deflectable finger wherein at least one deflectable finger cooperates with the first detent to retain the electrical connector assembly in a pre-staged position and the at least one deflectable finger cooperates with the second detent when the electrical connector is moved to retain the electrical connector assembly in a final staged position.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

Referring to FIGS. 1 and 4-7, a floatable electrical connector header assembly 10 is shown mounted to a fixed member, such as a wire harness tray 12 which is fixed to a housing 14. A portion of the header assembly 10 extends through an opening 16 (FIGS. 4 and 6) provided in a cover 18 which is mounted to the housing 14.

The housing 14 may be a structural component of a device (not shown). For example, the housing 14 may be a chassis, a block, a frame, a case, and/or the like. The device may be or include a motor, an engine, a transmission, a computer, a sensor, and/or the like. In an embodiment, the device may be an automotive device. For example, the device may be a transmission, and the housing 14 may be a transmission case.

In one or more embodiments, the connector assembly 10 may be a pass-through connector that extends through the opening 16 in the cover 18. The cover 18 optionally may be part of a panel or the like. In the embodiment shown, the cover 18 surrounds at least a part of the housing 14 of the device. The cover 18 may protect the device from debris, liquids, and other contaminants external to the cover 18. The cover 18 also may be used as a barrier to maintain internal conditions (e.g., temperature, pressure, gases) within the cover 18 that may differ from ambient external conditions. The cover 18 may be separately mounted or coupled to the housing 14 from the connector assembly 10, with the connector assembly 10 aligned with and/or extending through the opening 16.

Figure 1:
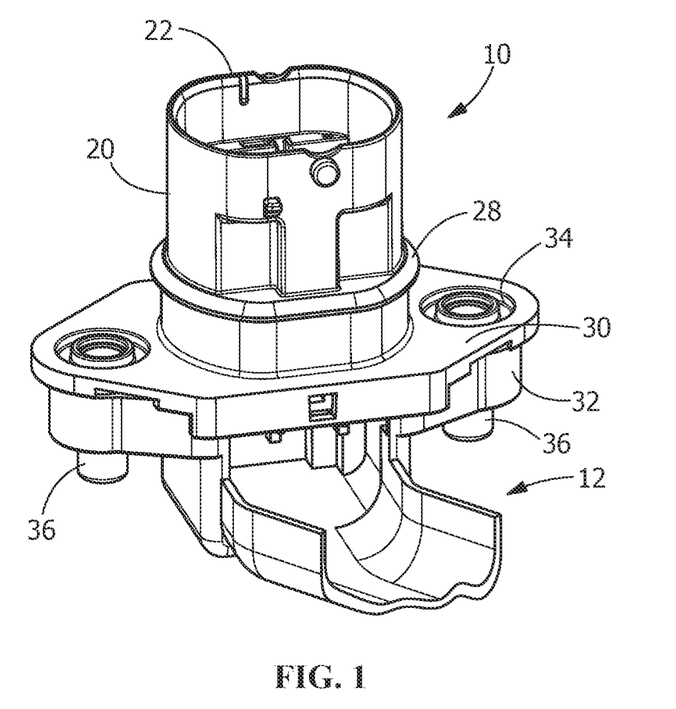
FIG. 1 is a perspective view of an illustrative header assembly of the present invention with mounting projections provided thereon positioned on a wire harness tray.

Although the connector assembly 10 in the illustrated embodiment is a pass-through header connector, it is understood that FIG. 1 is merely an example application for the connector assembly 10, and the connector assembly 10 is not limited to a pass-through header connector. In other applications, the connector assembly 10 may be a header connector that does not pass through a panel, may be a pass-through connector that does not mount to a header, or may be neither a header connector nor a pass-through connector. The connector assembly 10 may be referred to herein as floatable connector assembly 10.

Figure 2:
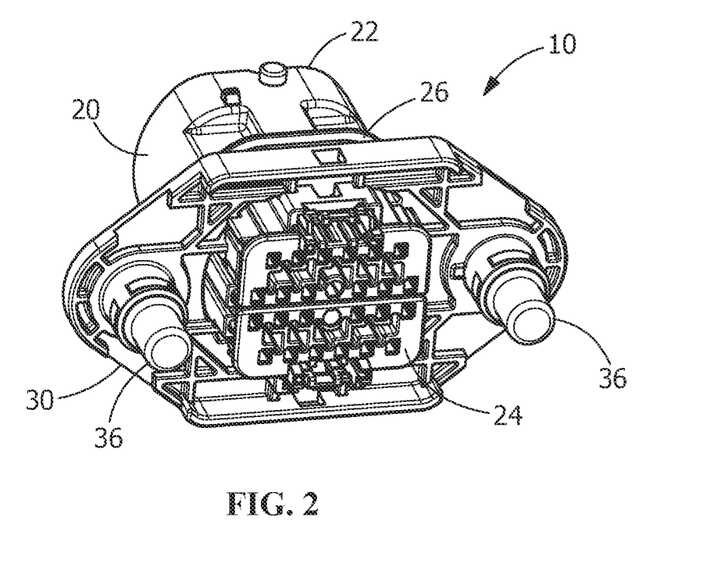
FIG. 2 is a bottom perspective view of the header assembly of FIG. 1.

FIG. 2 is a perspective view of an illustrative embodiment of the floatable connector assembly 10. The connector assembly 10 includes a header housing 20. The housing 20 includes a mating end 22 and a mounting end 24. The mating end 22 is configured to interface with a mating connector (not shown). For example, the mating end 22 defines a receptacle that receives the mating connector therein.

Figure 4:
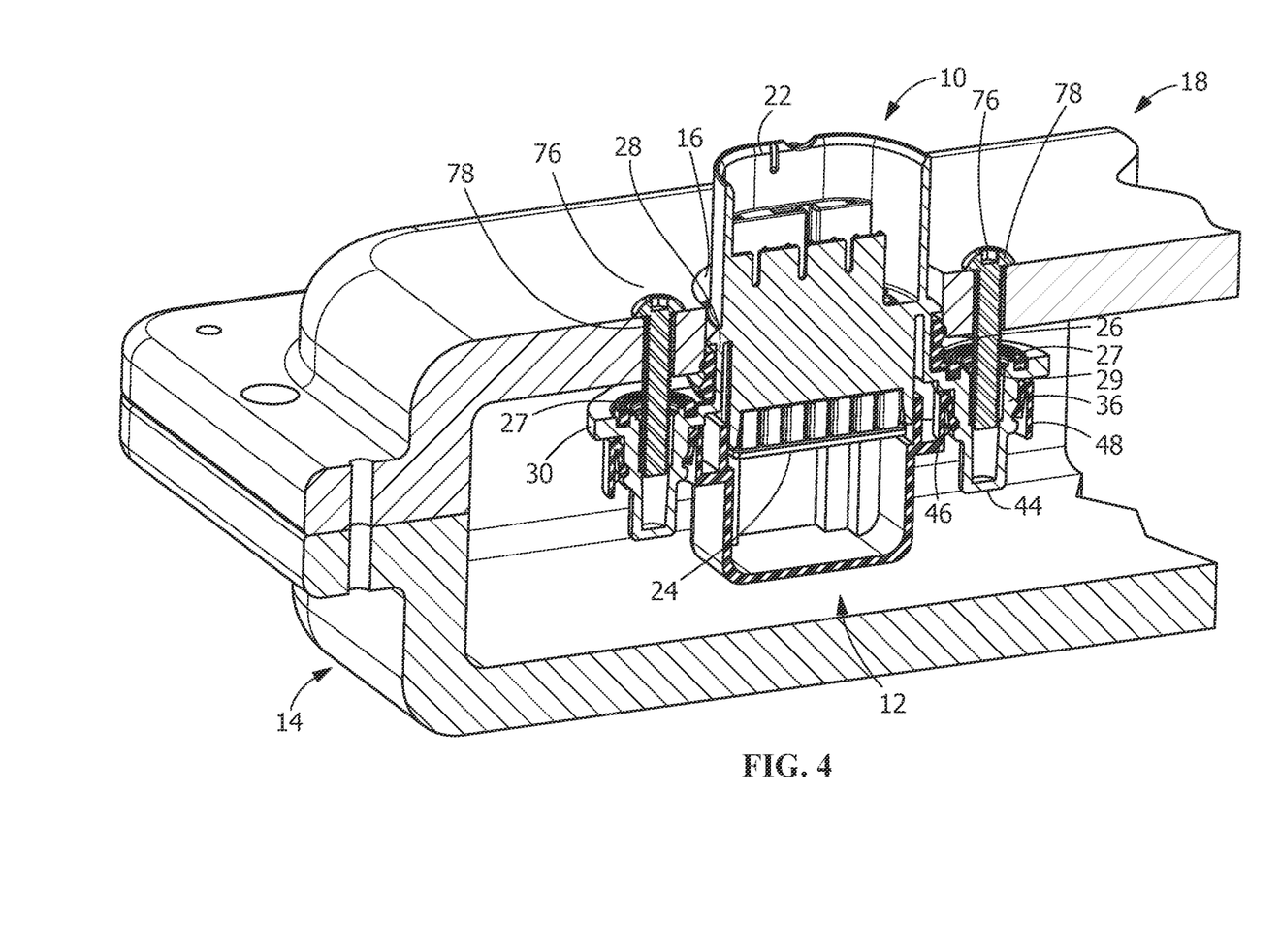
FIG. 4 is a perspective cross-sectional view showing a cover positioned over the header assembly and wire harness, the cover shown in an initial position.
Figure 6:
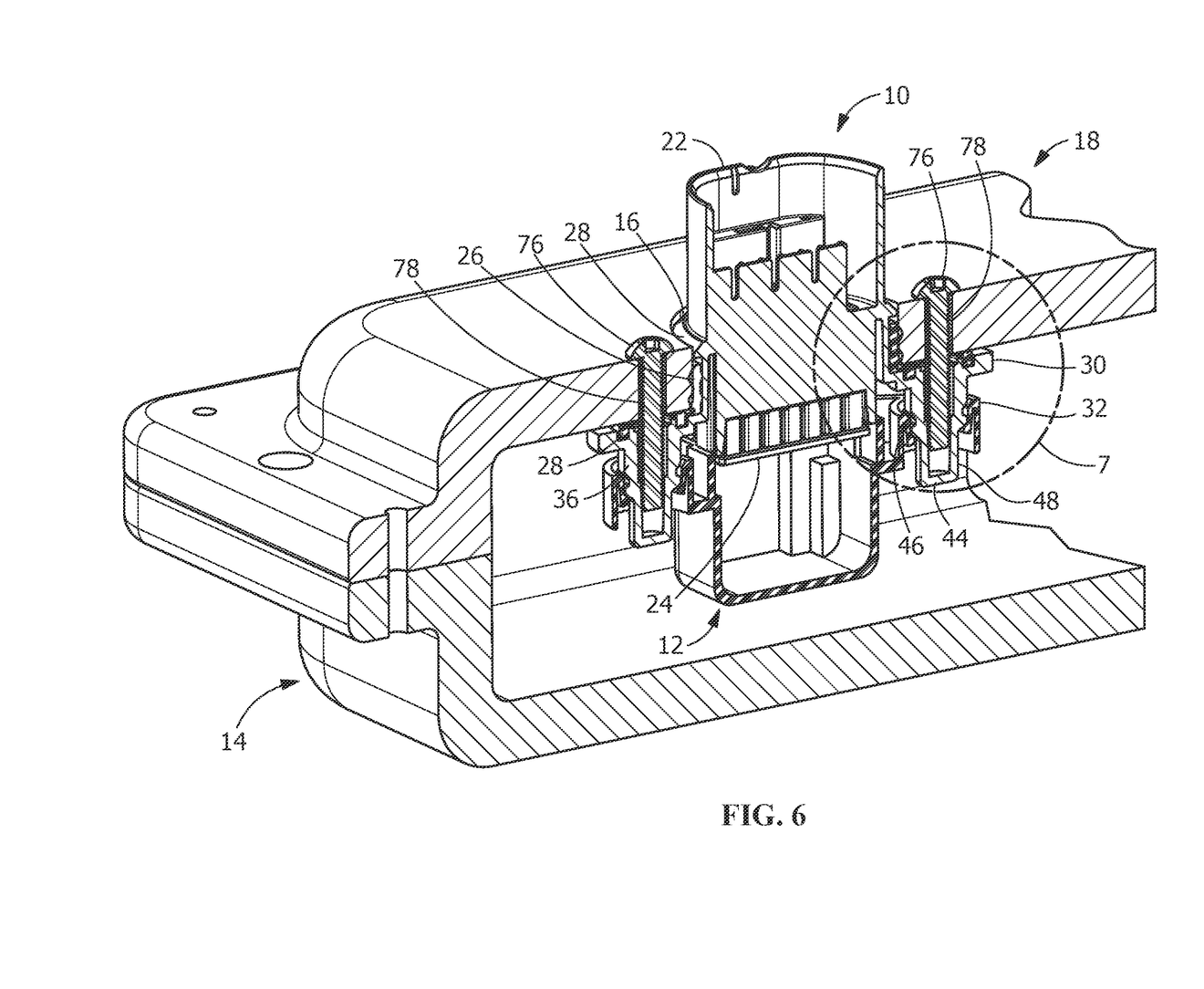
FIG. 6 is a perspective cross-sectional view showing the cover positioned over the header assembly and wire harness, the cover shown in a fully secured position.

As shown in FIGS. 4 and 6, the mating end 22 of the housing 20 extends through the opening 16 of the cover 18. The opening 16 may be configured to have an area slightly larger than a cross-sectional area of the mating end 22 of the housing 20 to allow the mating end 22 to extend through the opening 16. In the illustrative embodiment, the connector assembly 10 includes a compression seal 26 that is disposed around a periphery of the housing 20 between the mating end 22 and the mounting end 24. The compression seal 26 is configured to be received between the housing 20 and the opening 16 to seal the housing 20 to the cover 18. For example, the compression seal 26 may fill gaps between the housing 20 and the cover 18 that are present due to the opening 16 being slightly larger than a cross-section of the housing 20. Optionally, the housing 20 may include a raised shoulder 28 that receives the compression seal 26 thereon.

Figure 5:
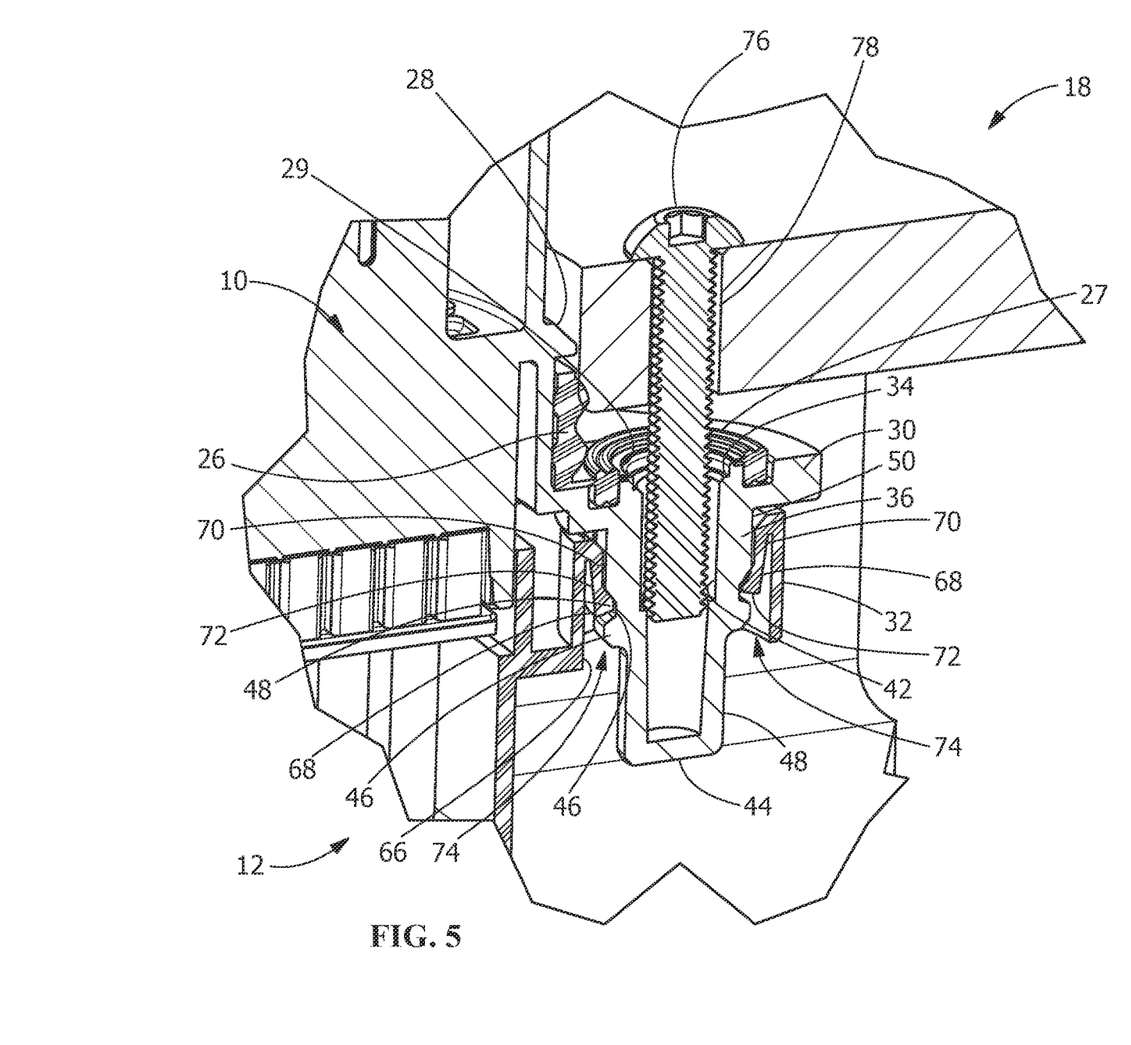
FIG. 5 is an enlarged cross-sectional view taken along line 5-5 of FIG. 4.

The mounting end 24 of the housing 20 has an electrical connector assembly flange 30 which is configured to abut a mounting surface or fixed member flange 32 of the wire harness tray 12 on which the connector assembly 10 is mounted. As shown in FIG. 1, mounting openings 34 are provided in the flange 30. As shown in FIG. 5, openings 29 are provided in the compression seal 26 and are positioned proximate and aligned with mounting openings 34.

Figure 7:
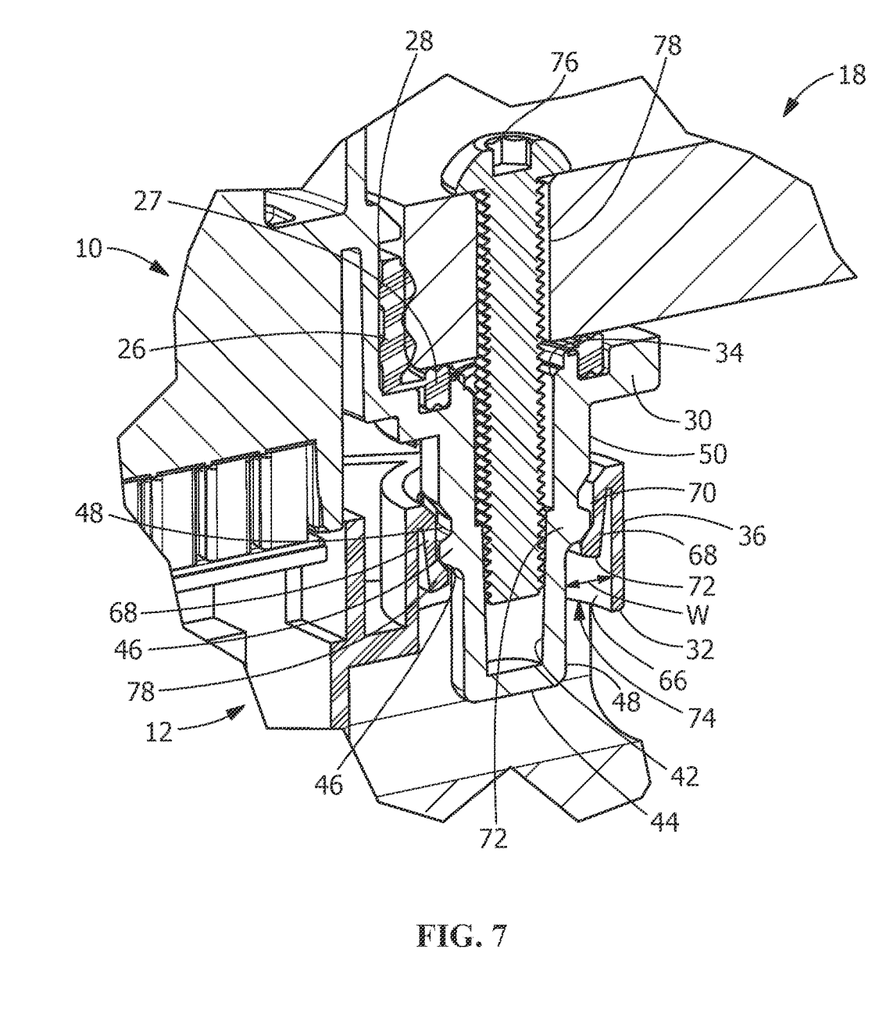
FIG. 7 is an enlarged cross-sectional view taken along line 7-7 of FIG. 6.

Mounting projections 36 extend from the mounting openings 34 in a direction away from the mating end 22. In the illustrative embodiment shown, the mounting projections 36 are integral with the flange 30. However, in other embodiments, the mounting projections 36 may be separate pieces which are attached to the flange 30. As shown in FIGS. 5 and 7, the mounting projections 36 are cylindrical members which have hardware receiving openings 42. Bottom or end walls 44 are positioned at the end of the mounting projections 36.

As shown in FIGS. 5 and 7, detents 46 are provided on outwardly facing walls 50 of the mounting projections 36. The detents 46 may be spaced apart about the circumference of the outwardly facing walls 50 or may extend circumferentially around the outwardly facing walls 50. A first recess 48 and a second recess 49 are provided on the outwardly facing walls 50 of the mounting projections 36. The first recess 48 may be more than one recess which are spaced apart about the circumference of the outwardly facing walls 50 or may extend circumferentially around the outwardly facing walls 50. The second recess 49 may be more than one recess which are spaced apart about the circumference of the outwardly facing walls 50 or may extend circumferentially around the outwardly facing walls 50. The second recess 49 is positioned proximate the bottom walls 44 of the mounting projections 36. The first detents 46 are spaced from the first recess 48 and are positioned closer between the first recess 48 and the second recess 49.

The housing 20 may be formed of an electrically insulating material, such as a plastic, a rubber-like polymer, and/or the like. Optionally, the housing 20 may be molded into a single integral component. The housing 20 includes a plurality of contacts (not shown). The contacts may be formed of a conductive material, such as copper or another metal. The contacts may be terminated to wires of a wire harness or directly to a circuit board within the device.

The compression seal 26 may be formed of a compressive material, such as rubber, a rubber-like polymer, or the like, such that the seal 26 is able to be compressed between the housing 20 and the cover 18 (shown in FIGS. 6 and 7). In the illustrative embodiment, the seal 26 is a band, such as, but not limited to a gasket, that extends continuously around a perimeter of the housing 20.

Figure 3:
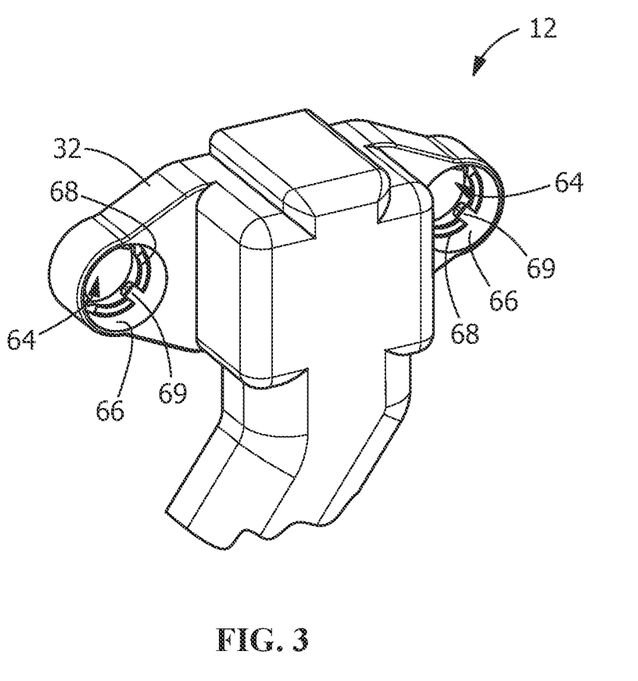
FIG. 3 a bottom perspective view of the wire harness tray of FIG. 1.

As shown in FIG. 3, the flange 32 of the wire harness tray 12 has openings or apertures 64 which extend through the flange 32. Each of the openings 64 has an inner surface 66 with at least one deflectable finger 68 that extends at least partially into the opening 64 from the inner surface 66. For example, the deflectable fingers 68 extend into the openings 64 such that the deflectable fingers 68 decrease the diameter of the opening 64 relative to the diameter of the opening 64 as defined by the inner surface 66. The deflectable fingers 68 are biased to extend into the openings 64, whereby the deflectable fingers 68 may be deflected radially outward by a contacting force, but once the contacting force is removed, the deflectable fingers 68 deflect back toward their unstressed position and extend into the openings 64. In an illustrative embodiment, spaces 69 are defined between adjacent deflectable fingers 68 of the opening 64. Optionally, the openings 64 include a plurality of deflectable fingers 68 that are evenly spaced around a perimeter of the inner surfaces 66. Each of the deflectable fingers 68 may be independently deflectable. In an alternative embodiment, each of the openings 64 may have only a single deflectable finger 68 that extends around the perimeter of the inner surface 66.

As shown in FIGS. 5 and 7, the deflectable fingers 68 each have a base 70 that protrudes from the inner surface 66. Each of the deflectable fingers 68 have a distal end 72 at an opposite end from the base 70 and extend at least partly into the opening 64 such that the distal end 72 is more proximate to the center (e.g., axis) of the opening 64 than the base 70. In addition to extending towards the center of the opening 64, the deflectable fingers 68 also extend at least partially in a direction parallel to the loading direction of the mounting projections 36.

As the connector assembly 10 is mounted to the wire harness tray 12, the mounting projections 36 are inserted into the openings 64. As this occurs, the mounting projections 36 engage the deflectable fingers 68, causing the deflectable fingers 68 to be resiliently deflected outward. Insertion of the connector assembly 10 and the mounting projections 36 continues, until the flange 32 of the wire harness tray 12 engages the flange 30 of the electrical connector assembly 10. As this occurs, the first detents 46 of the outwardly facing walls 50 of the mounting projections 36 are moved into alignment with the deflectable fingers 68 of the wire harness tray 12. This allows the deflectable fingers 68 to deflect radially inward and resiliently return toward their unstressed position, causing the distal end 72 of the deflectable fingers 68 to be positioned in the first detents 46, as shown in FIGS. 4 and 5. In this position, the electrical connector assembly 10 is maintained in a first or pre-staged position.

In an exemplary embodiment, the diameter of the inner surfaces 66 of the openings 64 of the flanges 32 are greater than the diameter of the outwardly facing walls 50 of the mounting projections 36. As a result, an axially extending gap 74 is formed or defined between the inner surfaces 66 and the outwardly facing walls 50. The gap 74 has a length that extends in the axial direction generally parallel to the axis of the mounting projections 36. The gap 74 has a width W (FIG. 7) that extends in the radial direction. In the illustrative embodiment, the width W of the gap 74 is approximately equal on all sides of the mounting projections 36, as the mounting projections 36 and opening 64 are approximately concentric along the axis of the mounting projections 36.

The mounting projections 36 are able to float radially within the gap 74 relative to the openings 64, thereby allowing the connector assembly 10 to float radially relative to the wire harness tray 12 that is coupled to a device or structure.

When the mounting projections 36 and the openings 64 are aligned along the same axis, the connector assembly 10 is permitted to float radially relative to the wire harness tray 12 in any radial direction for a distance that is no more than the width W. The electrical assembly 10 is configured such that the mounting projections 36 are retained in the openings 64 regardless of the radial location of the mounting projections 36 relative to the openings 64. For example, even when the outwardly facing walls 50 of the mounting projections 36 contact the inner surfaces 66 of the openings 64 on one side such that the gap 74 is maximized on the opposite side, the mounting projections 36 are prohibited from moving axially out of the openings 64. As this occurs, the deflectable fingers 68 are less compressed on the side in which the gap 74 is maximized and more compressed on the opposed side. However, each of the deflectable fingers 68 is configured to cooperate with the first recesses 48 to prevent the axial movement of the mounting projections 36.

With the connector assembly 10 properly positioned on the wire harness tray 12, the cover 18 is positioned on the housing 14 of the device. One or more fasteners 76 may be used to properly position and mount the connector assembly 10 to the cover 18. The fasteners 76 are loaded through cover mounting openings 78 in the cover 18 and into the hardware receiving openings 42. In the illustrative embodiment, the fastener 76 are threaded bolt or screws. Alternatively, the fastener 76 may be another type of fastener.

Once coupled, the fastener 76 is fixed relative to the cover 18. Therefore, the connector assembly 10 is able to float radially along the gap 74 relative to the wire harness tray 12 (as described above). Consequently, as the connector assembly 10 is allowed to have a limited movement perpendicular to the axis of the mounting projection 36, the connector assembly 10 is not fixed relative to the opening 16 in the cover 18, allowing the connector assembly 10 to be moved into alignment with the opening 16. In some known connector systems, if one or more measurements or positions of the cover 18, the housing 14, or the connector assembly 10 are off by even a slight margin, the connector assembly 10 may not align correctly with the opening 16 in the cover 18.

Even if the connector assembly 10 fits within the opening 16, the misalignment causes uneven sealing between the edges of the opening 16 and the connector assembly 10. The uneven sealing can result in undesirable leaks that allow the transfer of temperature, pressure, contaminants, gases, liquids, debris, and/or the like through the window between the connector and the panel.

In contrast, the connector assembly 10 is able to float relative to the wire harness tray 12 and the cover 18 to align the connector assembly 10 with the opening 16. As the cover 18 is positioned on the housing 14 of the device, the mating end 22 of the housing 20 of the connector assembly 10 is loaded through the opening 16. In addition, the fasteners 76 are inserted into the openings 42. As the connector assembly 10 is able to float relative to the wire harness tray 12 and the cover 18, the openings 42 can be moved into alignment with the mounting projections 36 to properly align with the fasteners 76 with the mounting projections 36.

As the fasteners 76 are tightened, the connector assembly 10 is moved toward the cover 18, causing the connector assembly 10 to move away from the wire harness tray 12. As this occurs, the mounting projections 36 are moved from the pre-staged position shown in FIG. 5, in which the distal ends 72 of the deflectable fingers 68 are retained in the first recesses 48, to the final stage position shown in FIG. 7, in which the distal ends 72 of the deflectable fingers 68 are retained in the second recesses 49. As this occurs, the deflectable fingers 68 are moved from the first recesses 48, causing the deflectable fingers 68 to be resiliently deflected outward by the first detents 46. The distal ends 72 of the deflectable fingers 68 and the lead-in surfaces of the first detents 46 are angled to allow for the first detents 46 to be easily moved past the deflectable fingers 68. The fasteners 76 are tightened until the flange 30 of the connector assembly 10 is positioned proximate the cover 18. As this occurs, the second recesses 49 of the outwardly facing walls 50 of the mounting projections 36 are moved into alignment with the deflectable fingers 68 of the wire harness tray 12. This allows the deflectable fingers 68 to deflect radially inward and resiliently return toward their unstressed position, causing the distal end 72 of the deflectable fingers 68 to be positioned in the second recesses 49. In the embodiment shown in FIGS. 1 through 7, the second recesses 49 extends to the bottom wall 44, allowing the flexible fingers 68 to be positioned in different positions in the second recesses 49, thereby allowing for the cover 18 to be mated to the connector assembly 10 without the need to tightly control the tolerances of the parts.

As the connector assembly 10 is moved to the final stage position, the compression seal 26 engages an interior wall of the cover 18 that defines the opening 16. If the opening 16 is not properly aligned with the connector assembly 10, the force from the interior wall on the seal 26 causes the housing 20 of the connector assembly 10 to float in a direction to reduce unbalanced forces. For example, if the housing 20 is too close on a first edge or side of the opening 16, the interior wall at the first edge will apply more force on the seal 26 than is applied by the interior wall at the opposite edge or side of the opening 16, where the clearance is greater. As a result, the housing 20 may move or float towards the opposite edge until the forces on the seal 26 from both edges are approximately equal and the housing 20 is centered in the opening 16. Therefore, as the mounting projections 36 are movable in the radial direction, the housing 20 is able to self-center itself within the opening 16 of the cover 18 as the fasteners 76 are moved into the mounting projections 36. When the housing 20 is centered, the compressive forces on the compression seal 26 may be generally equal around the perimeter of the housing 20, which reduces the likelihood of leaks through the opening 16 between the cover 18 and the connector assembly 10.

Figure 8:
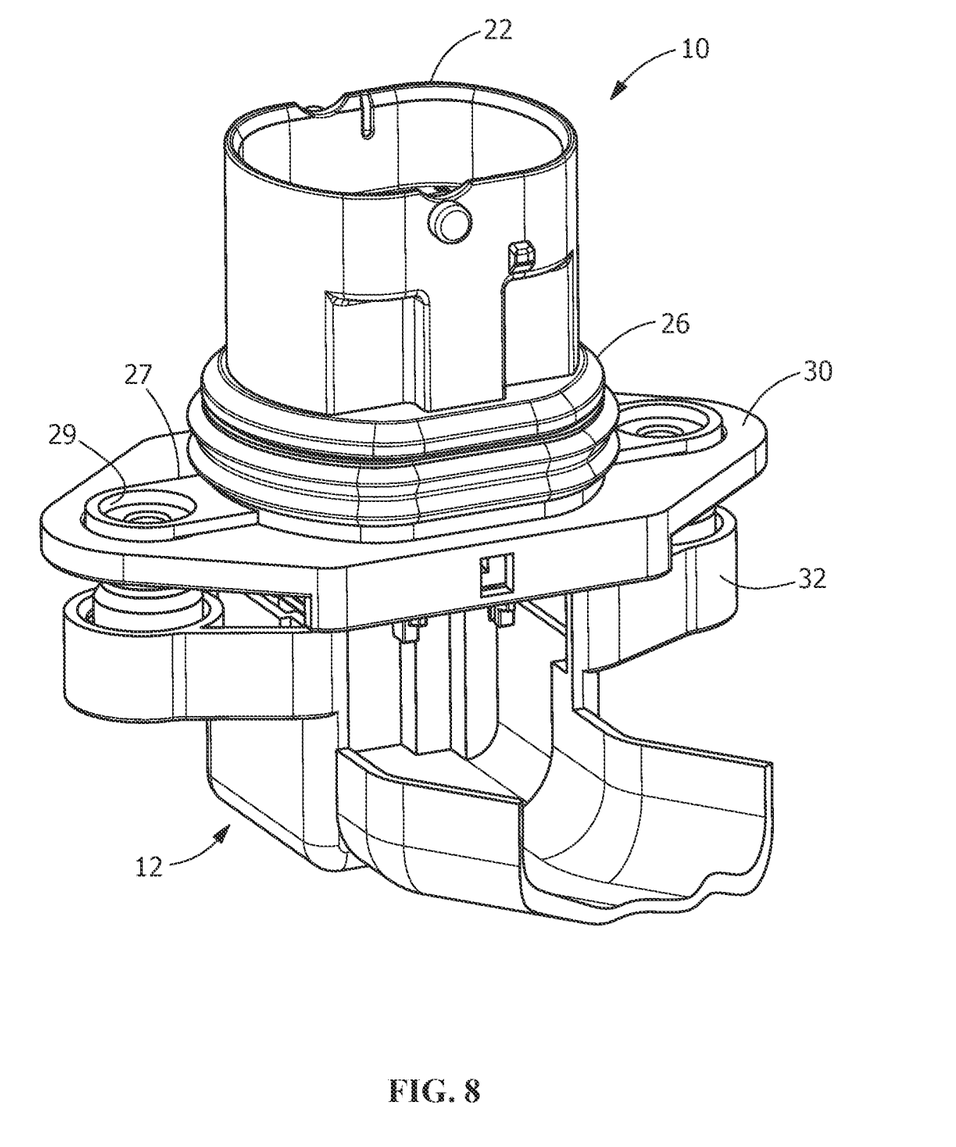
FIG. 8 is a bottom perspective view of an alternate illustrative header assembly.
Figure 9:
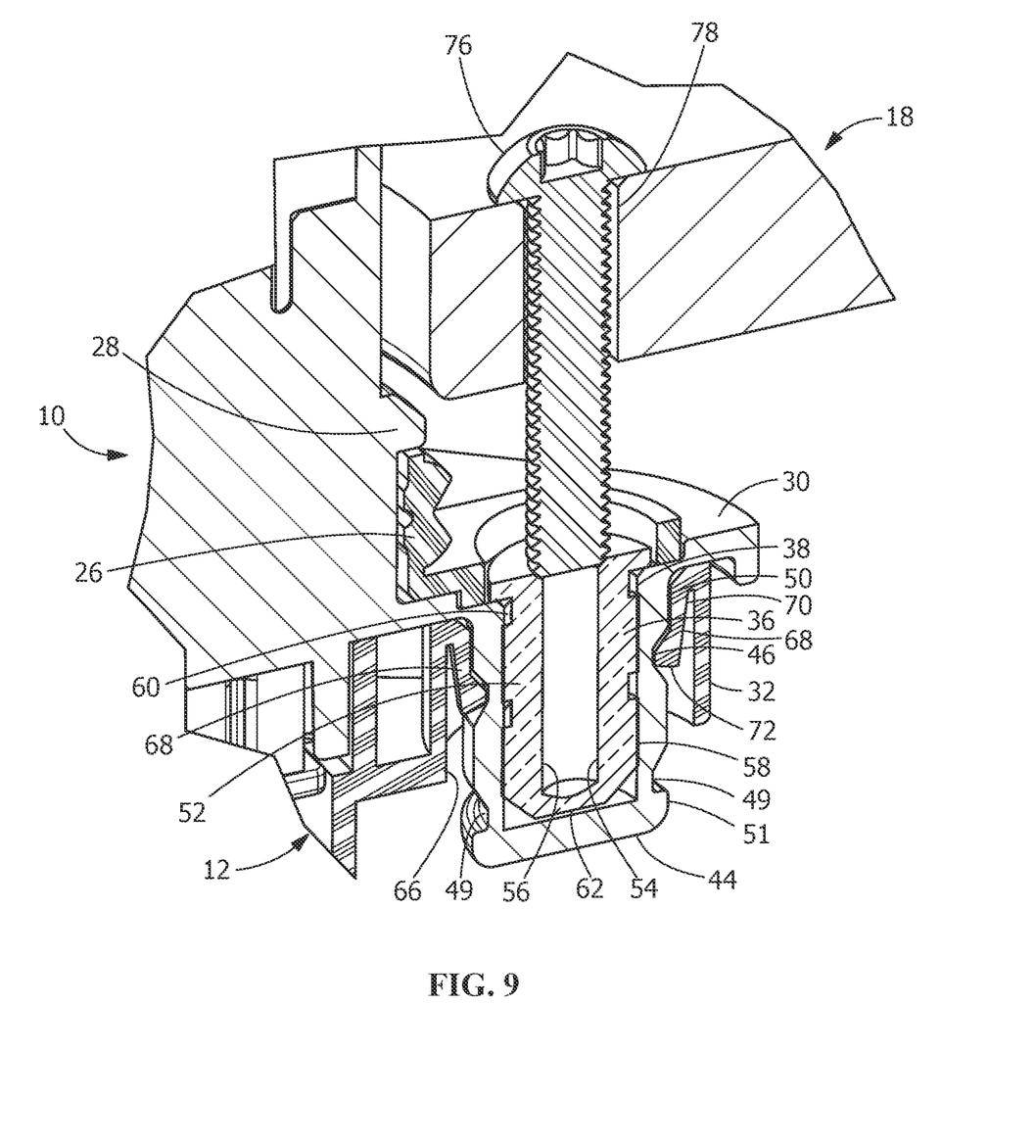
FIG. 9 is an enlarged cross-sectional view of the mounting section showing the cover positioned over the header assembly and wire harness, the cover shown in an initial position.
Figure 10:
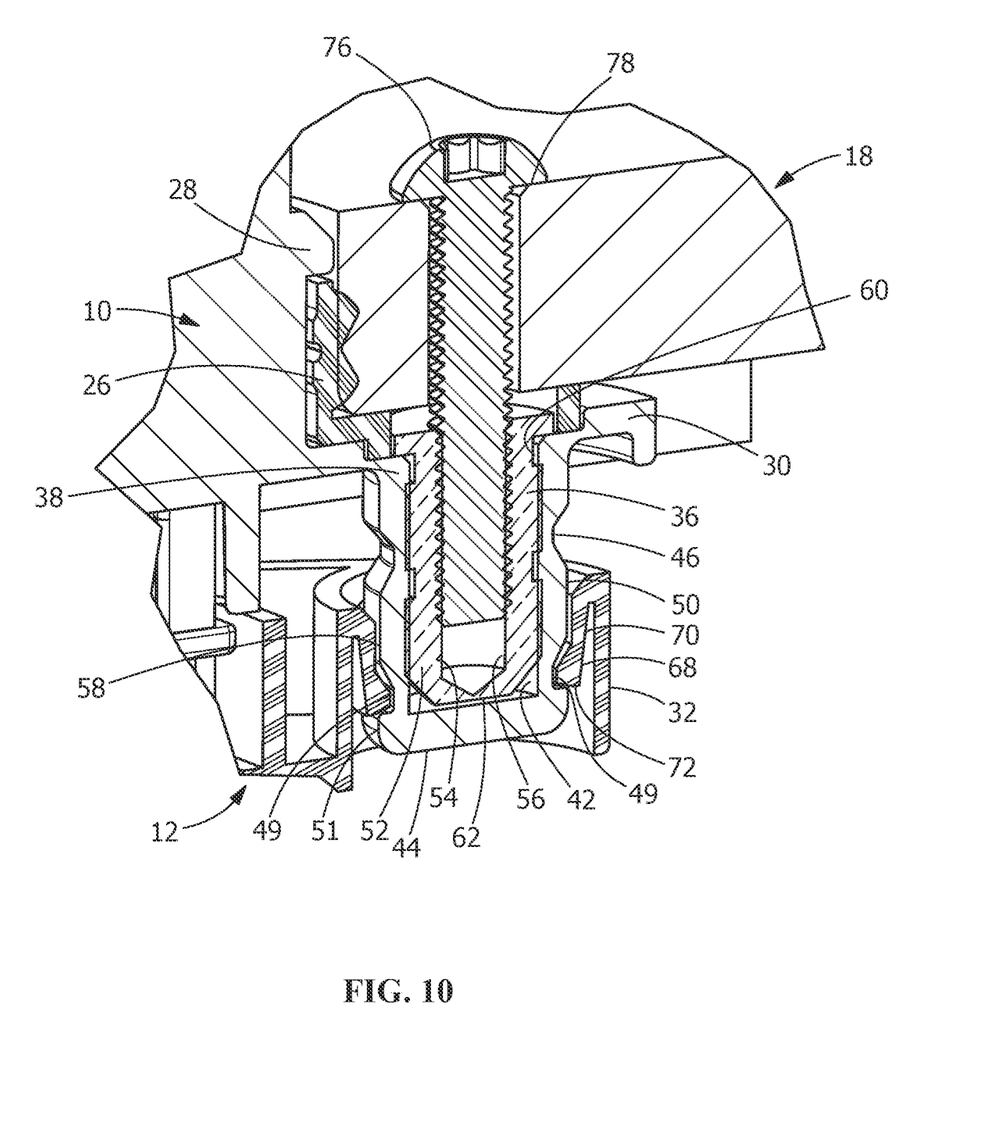
FIG. 10 is an enlarged cross-sectional view of the mounting section showing the cover positioned over the header assembly and wire harness, the cover shown in a fully secured position.

An alternate illustrative embodiment is shown in FIGS. 8-10. This embodiment has many of the same components and operates in essentially the same manner as described above. However, the second recesses 49 described above are modified to provide for a tight fit between the cover 18 and the connector assembly 10. The second recesses 49 are positioned proximate, but space from, the bottom walls 44 of the mounting projections 36. The second recess 49 may be more than one recess which are spaced apart about the circumference of the outwardly facing walls 50 or may extend circumferentially around the outwardly facing walls 50. Second detents 51 extend from the bottom wall 44 and are positioned at an end of the second recess 49. The second detents 51 are provided on outwardly facing walls 50 of the mounting projections 36. The second detents 51 may be spaced apart about the circumference of the outwardly facing walls 50 or may extend circumferentially around the outwardly facing walls 50.

In addition, mounting inserts 52, as shown in FIGS. 9 and 10, are positioned in the openings 42 of the mounting projections 36 and in alignment with the openings 34 of the flange 30. The mounting inserts 52 have a generally cylindrical configuration, with fastener or mounting hardware receiving openings 54 extending along the longitudinal axis of the mounting inserts 52. The interior walls 56 of the mounting hardware receiving openings 54 are threaded to cooperate with mating fasteners or hardware. The outwardly facing walls 58 of the mounting inserts 52 have securing recesses 60 which may be spaced apart about the circumference of the outwardly facing walls 58 or may extend circumferentially around the outwardly facing walls 58. Bottom or end walls 62 are positioned at the end of the mounting inserts 52.

The mounting inserts 52 are inserted into the openings 42 of the mounting projections 36. When fully inserted, securing ribs 38 of the mounting projections 36 are positioned in the securing recesses 60 of the mounting inserts 52. The cooperation of the securing ribs 38 with the securing recesses 60 provides an interference fit between the mounting inserts 52 and the mounting projections 36 to maintain the mounting inserts 52 in the openings 42 of the mounting projections 36.

With the connector assembly 10 properly positioned on the wire harness tray 12, the cover 18 is positioned on the housing 14 of the device. One or more fasteners 76 may be used to properly position and mount the connector assembly 10 to the cover 18. The fasteners 76 are loaded through cover mounting openings 78 in the cover 18 and into the mounting hardware receiving openings 54 of the mounting inserts 52. In the illustrative embodiment, the fastener 76 are threaded bolt or screws. Alternatively, the fastener 76 may be another type of fastener.

Once coupled, the fastener 76 is fixed relative to the cover 18. Therefore, the connector assembly 10 is able to float radially along the gap 74 relative to the wire harness tray 12 (as described above). Consequently, as the connector assembly 10 is allowed to have a limited movement perpendicular to the axis of the mounting projection 36, the connector assembly 10 is not fixed relative to the opening 16 in the cover 18, allowing the connector assembly 10 to be moved into alignment with the opening 16. In some known connector systems, if one or more measurements or positions of the cover 18, the housing 14, or the connector assembly 10 are off by even a slight margin, the connector assembly 10 may not align correctly with the opening 16 in the cover 18. Even if the connector assembly 10 fits within the opening 16, the misalignment causes uneven sealing between the edges of the opening 16 and the connector assembly 10. The uneven sealing can result in undesirable leaks that allow the transfer of temperature, pressure, contaminants, gases, liquids, debris, and/or the like through the window between the connector and the panel.

In contrast, the connector assembly 10 is able to float relative to the wire harness tray 12 and the cover 18 to align the connector assembly 10 with the opening 16. As the cover 18 is positioned on the housing 14 of the device, the mating end 22 of the housing 20 of the connector assembly 10 is loaded through the opening 16. In addition, the fasteners 76 are inserted thorough the openings 54 of the mounting inserts 52 into the mounting projections 36. Therefore, as the mounting projections 36 are movable in the radial direction, the housing 20 is able to self-center itself within the opening 16 of the cover 18 as the fasteners 76 are moved into the mounting projections 36.

In this embodiment, as the fasteners 76 are tightened, the connector assembly 10 is moved toward the cover 18, causing the connector assembly 10 to move away from the wire harness tray 12. As this occurs, the mounting projections 36 with the mounting inserts 52 positioned therein are moved from the pre-staged position shown in FIG. 9 in which the distal ends 72 of the deflectable fingers 68 are retained in the first recesses 48, to the final stage position shown in FIG. 10, in which the distal ends 72 of the deflectable fingers 68 are retained in the second recesses 49. As this occurs, the deflectable fingers 68 are moved from the first detents 46, causing the deflectable fingers 68 to be resiliently deflected outward.

The fasteners 76 are tightened until the flange 30 of the connector assembly 10 is positioned proximate the cover 18. As this occurs, the deflectable fingers 68 are moved from the first recesses 48, causing the deflectable fingers 68 to be resiliently deflected outward by the first detents 46. The distal ends 72 of the deflectable fingers 68 and the lead-in surfaces of the first detents 46 are angled to allow for the first detents 46 to be easily moved past the deflectable fingers 68. The fasteners 76 are tightened until the flange 30 of the connector assembly 10 is positioned proximate the cover 18. As this occurs, the second recesses 49 of the outwardly facing walls 50 of the mounting projections 36 are moved into alignment with the deflectable fingers 68 of the wire harness tray 12. This allows the deflectable fingers 68 to deflect radially inward and resiliently return toward their unstressed position, causing the distal end 72 of the deflectable fingers 68 to be positioned in the second recesses 49. In the embodiment shown in FIGS. 8 through 10, are smaller than the second recesses in the embodiment shown in FIGS. 1 through 7. Consequently, when the flexible fingers 68 are moved into the second recesses 49, the flexible fingers 68 are secured or locked in position and are prevented from inadvertent movement in a direction parallel to the axis of the mounting projections 36. This maintains the mounting projections 36 is the second or final stage position.

As the connector assembly 10 is moved to the final stage position, the compression seal 26 engages an interior wall of the cover 18 that defines the opening 16. If the opening 16 is not properly aligned with the connector assembly 10, the force from the interior wall on the seal 26 causes the housing 20 of the connector assembly 10 to float in a direction to reduce unbalanced forces. For example, if the housing 20 is too close on a first edge or side of the opening 16, the interior wall at the first edge will apply more force on the seal 26 than is applied by the interior wall at the opposite edge or side of the opening 16, where the clearance is greater. As a result, the housing 20 may float towards the opposite edge until the forces on the seal 26 from both edges are approximately equal and the housing 20 is centered in the opening 16. Therefore, the housing 20 is able to self-center itself within the opening 16 of the cover 18. When the housing 20 is centered, the compressive forces on the compression seal 26 may be generally equal around the perimeter of the housing 20, which reduces the likelihood of leaks through the opening 16 between the cover 18 and the connector assembly 10.

One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. An assembly comprising:
an electrical connector having a housing having a mounting opening with a mounting projection, an outwardly facing wall of the mounting projection having at least one detent;
a fixed member having a fixed member opening, the fixed member opening having an inner surface with at least one deflectable member which extends from the inner surface into the fixed member opening;
a gap provided between the inner surface of the fixed member opening and the outwardly facing wall of the mounting projection, wherein the mounting projection is able to float radially within the gap;
wherein the at least one deflectable member cooperates with the first detent to retain the electrical connector in a pre-staged position.

2. The assembly as recited in claim 1, wherein the housing has a mating end and an oppositely facing mounting end, the mounting end have an electrical connector assembly flange extending therefrom.

3. The assembly as recited in claim 2, wherein the mounting opening is provided on the electrical connector flange, the mounting projection extending from the electrical connector flange in a direction away from the mating end.

4. The assembly as recited in claim 3, wherein the mounting projection has a second detent spaced from the first detent, the at least one deflectable member cooperates with the second detent when the electrical connector is moved to retain the electrical connector in a final staged position.

5. The assembly as recited in claim 4, wherein the second detent is positioned proximate a bottom wall of the mounting projection and the first detent is spaced from the second detent and is positioned closer to the electrical connector flange than the second detent.

6. The assembly as recited in claim 5, wherein the first detent and the second detent extend circumferentially about the outwardly facing wall.

7. The assembly as recited in claim 3, wherein the mounting projection has a recess spaced from the first detent, the at least one deflectable member cooperates with the recess when the electrical connector is in a final staged position.

8. The assembly as recited in claim 7, wherein the recess is positioned proximate a bottom wall of the mounting projection and the first detent is spaced from the recess and is positioned closer to the electrical connector flange than the recess.

9. The assembly as recited in claim 8, wherein, the first detent and the recess extend circumferentially about the outwardly facing wall.

10. The assembly as recited in claim 1, wherein the mounting projections are integrally formed with the electrical connector flange.

11. The assembly as recited in claim 1, wherein the mounting projection is a cylindrical member which have securing ribs extending circumferentially about an interior wall of an insert receiving opening.

12. The assembly as recited in claim 11, wherein a mounting insert is positioned in the insert receiving opening of the electrical connector flange, the mounting insert has a generally cylindrical configuration with a fastener receiving opening extending along a longitudinal axis of the mounting insert.

13. The assembly as recited in claim 12, wherein an outwardly facing wall of the mounting insert has securing recesses which extend circumferentially around the outwardly facing wall of the mounting insert, wherein the securing recesses cooperate with the securing ribs of the mounting projection to retain the mounting insert in the mounting projection.

14. The assembly as recited in claim 13, wherein an interior wall of the fastener receiving opening is threaded to cooperate with a mating fastener.

15. The assembly as recited in claim 14, wherein each of the at least one deflectable member has a base that protrudes from the inner surface of the fixed member opening and a distal end, the distal end is positioned closer to a center of the insert receiving opening than the base.

16. The assembly as recited in claim 15, wherein the fixed member is attached to a housing having a cover, the cover having an opening for receipt of the mating end of the electrical connector therein.

17. The assembly as recited in claim 16, wherein the cover has cover mounting openings which are configured to receive fasteners therethrough, the fasteners cooperate with the fastener receiving opening of the mounting insert, wherein, as the fastener is tightened, the mounting insert and the mounting projection are moved from the pre-staged position to the final stage position.

18. The assembly as recited in claim 10, wherein a compression seal is provided around the housing.

19. An assembly comprising:
an electrical connector having a housing having a mating end and an oppositely facing mounting end, the mounting end have an electrical connector flange extending therefrom, the electrical connector flange having a mounting opening, a mounting projection extending from the electrical connector flange in a direction away from the mating end, an outwardly facing wall of the mounting projection having a first detent and a second detent;
a fixed member having a fixed member flange, the fixed member flange having a fixed member opening, the fixed member opening having an inner surface with at least one deflectable member which extends from the inner surface into the fixed member opening;
a gap is provided between inner surface of the fixed member opening and the outwardly facing wall of the mounting projection, wherein the mounting projections are able to float radially within the gap;
the mounting projection is movable relative to the at least one deflectable member wherein the at least one deflectable member cooperates with the first detent to retain the electrical connector in a pre-staged position and the at least one deflectable member cooperates with the second detent when the electrical connector is moved to retain the electrical connector in a final staged position.

20. The assembly as recited in claim 19, wherein the second detent is a recess which extend to a bottom wall of the mounting projection.

* * * * *